Aug. 3, 1965                R. M. PURDY ETAL                3,198,117
        ELECTRICALLY TRIGGERED SQUIB WITH SEMI-CONDUCTIVE
                    DISSIPATER FOR STRAY CURRENTS
                        Filed Oct. 2, 1961
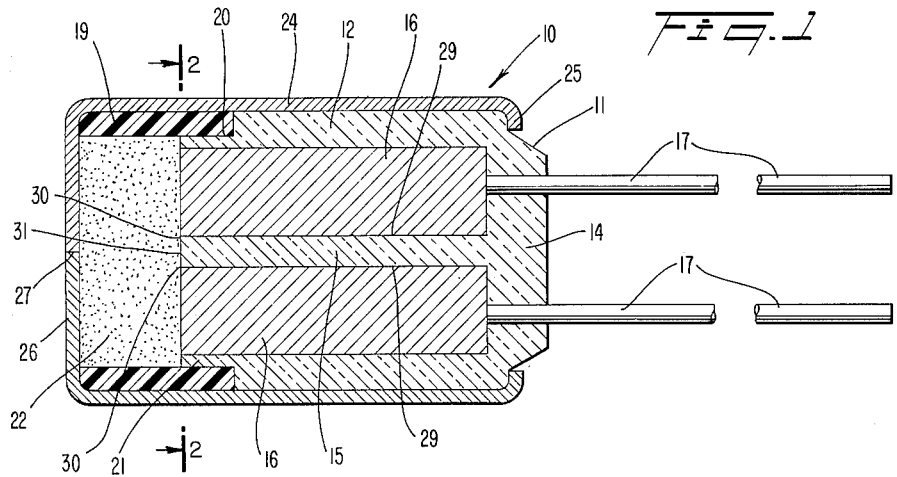
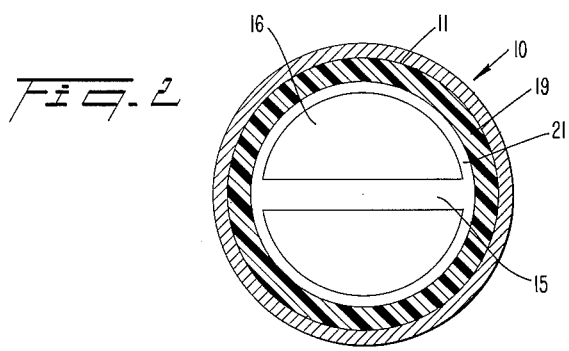
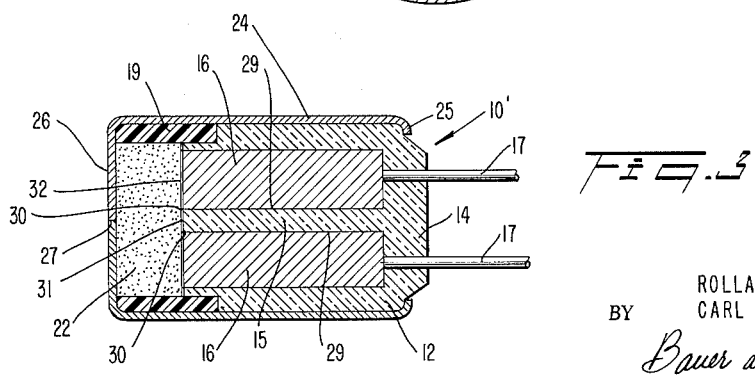
INVENTORS
ROLLAND M. PURDY
CARL R. JOSLYN
BY
Bauer and Seymour
ATTORNEYS 3,198,117
ELECTRICALLY TRIGGERED SQUIB WITH SEMI-CONDUCTIVE DISSIPATER FOR STRAY CURRENTS
Rolland M. Purdy, Bainbridge, and Carl R. Joslyn, Sidney, N.Y., assignors to The Bendix Corporation, Sidney, N.Y., a corporation of Delaware
Filed Oct. 2, 1961, Ser. No. 142,262
17 Claims. (Cl. 102—28)

This invention relates to an electrically triggered squib.

The invention has among its objects the provision of an electrically triggered squib which is particularly characterized by its substantial immunity to actuation by electrical energy of radio frequency.

A further object of the invention lies in the provision of a squib of the character indicated which can be fired only upon its subjection to a triggering pulse having a predetermined voltage and energy content.

Still another object of the invention lies in the provision of an electrically triggered squib which is simple and rugged in construction and which is economically made.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings wherein like reference characters refer to like parts throughout the several views, FIG. 1 is a view in axial section through a first preferred embodiment of the squib of the invention, certain of the parts being shown in elevation;

FIG. 2 is a view in transverse section through such first embodiment of squib, the section being taken along the line 2—2 of FIG. 1; and FIG. 3 is a view in axial section through a second embodiment of squib made in accordance with the invention, certain of the parts being shown in elevation.

The squib of the present invention is adapted for use, for example, to initiate functions as during the flight of a missile. For safe, dependable operation of the squib it is necessary that it be fired only upon the reception of a triggering pulse of a predetermined character.

Prior electrically triggered squibs have conventionally included one or more small gauge resistance wires disposed in proximity to explosive materials such as powder, the wire or wires being adapted to be heated to incandescence upon the reception of a triggering signal by the squib. Squibs of such prior construction are subject to a number of disadvantages, including the possibility of open circuit due to the breakage of the resistance wire or wires, unreliability due to inconsistency of soldering or welding of the fine wire or wires to the conductors, and a "dudding" of the powder by its subjection to a high temperature in the proximity of the resistance wire or wires, such high temperature being insufficient, however, to cause the firing of the powder. Perhaps the most serious difficulty encountered with squibs of such prior construction has been their misfiring because of their susceptibility to radio frequency radiation. The loop composed of the conductors and the fine resistance wire or wires is prone to the reception of radiation of radio frequency and the generation of currents in the loop through an induction effect of high enough amperage to ignite the powder. Such prior squibs might also be fired by the accidental connection of them to a source of power other than that of the triggering circuit.

The squib of the present invention overcomes the above-outlined difficulties encountered in the use of conventional prior squibs. The squib of the invention is substantially immune to the effects of energy of radio frequency received thereby, will not be triggered by being subjected to high ambient temperatures on the order of 600° F., will not be fired by being connected to a source of electrical energy ordinarily present in a vehicle such as a missile other than in the triggering circuit, and can be fired only by being subjected to a triggering pulse having a predetermined minimum voltage and energy content.

Turning now to the drawing, the first illustrative embodiment of squib, shown in FIGS. 1 and 2, is designated as a whole by the reference character 10. Such squib, which is of generally circular cylindrical shape, has a body 11 which is made of electrically semi-conductive material. Body 11 has a sidewall 12 in the form of a cylindrical sleeve, an end wall 14 at the right-hand end thereof as shown in FIG. 1, and a diametrically disposed plate-like partition 15 across the space presented by sidewall 12 and end wall 14. The partition 15 divides such space into two cavities of part-cylindrical shape as shown in FIG. 2. Disposed within such cavities are two opposed similar metal electrodes 16 of such shape and size as intimately to engage the walls of the cavities as shown in FIG. 1. Conductors 17, connected to the respective electrodes 16, project outwardly through the end wall 14 of body 11. Conductors 17 may be, for example, in the form of pin contacts adapted to be received within socket contacts of a separable electrical connector.

The left-hand ends of electrodes 16 and of partition member 15 lie substantially in a plane disposed transverse to the longitudinal axis of the squib. An annular seat 20 at the left-hand end of sidewall 12 snugly receives an end of an extension tube 19, which may be made of electrically insulating material such as a phenolic resin. A charge of explosive powder 22 is retained within the projecting portion of tube 19, such charge overlying the end of portion 21 of sidewall 12 of body 11, the aligned ends of electrodes 16, and the end surface 31 of partition member 15. In the embodiment shown there is provided a sleeve-like metal sheath 24 which surrounds and intimately engages the outer surface of sidewall 12 of body 11. The right-hand end of sheath 24 is spun over a shoulder on the right-hand end of body 11 as shown at 25. The left-hand end of sheath 24 is bent inwardly over the end of tube 19 and is formed into an end closure wall 26 having portions thereof meeting as shown at 27. The resulting structure is substantially liquid-tight and forms a cavity in which the explosive powder 22 is retained in the manner shown in FIG. 1.

When the conductors 17 are subjected to a triggering signal having the required minimum voltage and energy content, a discharge occurs between the confronting surfaces 29 of electrodes 16, such discharge taking place primarily at the opposed edges 30 of the electrodes in contact with powder 22. Thereupon, the powder in the vicinity of the gap between edges 30 is ignited, such ignition spreads rapidly throughout the mass of the powder, and the enclosure 26 of the squib is burst. The energy thus provided by the squib may be employed to initiate a variety of functions, such as the separation of parts of a missile, the opening or closing of switches, etc.

The body 11 may be made, for example, as an integrally molded element having partition 15 as a part thereof. The electrodes 16 may, for example, be suitably positioned and molded into body 11 as inserts therein. In a specific preferred embodiment of squib made in accordance with the invention, the body 11 is made of an epoxy resin having a finely divided graphite filler distributed therein. By suitable control of the amount of graphite filler employed, the desired specific resistance of body 11 may be obtained.

It will be seen that the confronting broad faces 29 of electrode 16 are in intimate contact with the plate-like partition member 15. Member 15 thus acts to allow the leakage of stray energy of radio frequency between electrodes without initiating a spark discharge between electrodes. Such shunting of the electrodes, and thus the protection of the squib against the action of energy of radio frequency is further aided by the presence of sidewall 12 and end wall 14 of body 11. The sidewall 12 of the body intimately contacts electrodes 16 throughout their non-confronting peripheral area, and the end wall 14 intimately contacts the ends of the electrodes remote from the powder charge 22. Thus energy of radio frequency may also be shunted from one electrode to the other through the sidewall 12 and the end wall 14 of body 11.

The specific resistance of body 11 and the thickness of partition 15, that is, the distance between edges 30 of the electrodes are so chosen that an arc discharge between such edges will occur only upon the reception of a triggering signal of the desired character. Such signal, for example, may be a 1,000 volt pulse produced by the high energy content discharge of a condenser. In a satisfactory squib in accordance with the embodiment of FIGS. 1 and 2, the resistance of the squib as measured between conductors 17 may be, for example, on the order of 1 ohm.

In FIG. 3 there is shown a second embodiment of squib, there designated 10′, in accordance with the invention. Such squib has a construction which is the same as that of FIGS. 1 and 2 with the exception of the provision of a thin coating of conductive metal 32 in contact with the left-hand ends of electrodes 16 and of partition 15. Consequently, the parts of the squib shown in FIG. 3 are designated by the same reference characters as those employed in FIGS. 1 and 2. The metal coating layer 32 may be made, for example, of antimony which may be deposited in situ as by a sputtering process. Metal layer 32 constitutes a second path for the flow of electrical energy between electrodes 16, such path being disposed in parallel with that through the partition 15.

The presence of metal layer 32 decreases the amount of energy required to fire the squib. Because such coating layer is thin, the current density in such layer is high compared to that through partition 15. In the embodiment of FIG. 3, for example, the resistance of the squib as measured between the conductors 17 may be, for example, on the order of .5 ohm.

The metal coating layer 32 is preferably applied under such conditions that the final total resistance of squib 10′ has a predetermined accurate value. Thus an ohmmeter may be connected across conductors 17 and placed in operation before the deposition of coating layer 32 begins. The reading of the ohmmeter is closely observed during the formation of the metal coating layer, deposition of metal forming the layer being terminated when the ohmmeter indicates that the squib has the desired total resistance. Following deposition of layer 32, explosive powder 22 is charged into the end of the squib, and the end of the sheath 24 is then bent to form the end closure member 26, as in the embodiment of FIGS. 1 and 2.

Although only two embodiments of electrically triggered squib in accordance with the present invention, and one embodiment of method of forming a squib in accordance with the invention have been illustrated in the accompanying drawing and described in the foregoing specification, it is to be especially understood that various changes, such as in the relative dimensions of the parts, materials used, and the like, as well as the suggested manner of use of the apparatus of the invention, may be made therein without departing from the spirit and scope of the invention as will now be apparent to those skilled in the art.

What is claimed is:

1. An electrically triggered squib, which comprises opposed spaced electrodes presenting a spark gap between them, said electrodes having confronting broad surfaces in a spark gap relationship and in intimate contact with a broad plate-like member of electrically semi-conductive material, an electrically conductive metal coating shunted across the spark gap electrically in parallel with said semi-conductive plate-like member, and spark ignitable explosive material disposed adjacent the spark gap in postion to be ignited thereby.

2. An electrically triggered squib which comprises opposed spaced electrodes presenting a spark gap between them, said electrodes having confronting broad surfaces in spark gap relationship and in intimate contact with a broad plate-like member of electrically semi-conductive material and non-confronting surfaces, a tubular member made of electrically semi-conductive material surrounding said electrodes and intimately contacting said non-confronting surfaces of said electrodes, and spark ignitable explosive material disposed adjacent the spark gap in position to be ignited thereby.

3. An electrically triggered squib which comprises opposed spaced electrodes presenting a spark gap between them, a broad plate-like member of electrically semi-conductive material, said electrodes having confronting broad surfaces in spark gap relationship and in intimate contact with said broad plate-like member and having non-confronting surfaces, a tubular member made of electrically semi-conductive material surrounding said electrodes and said plate-like member and intimately contacting said non-confronting surfaces of said electrodes, and spark ignitable explosive material disposed adjacent the spark gap in position to be ignited thereby, each of the electrodes having an end surface disposed generally transversely of its confronting broad surface, the end surfaces of the electrodes being generally aligned, the plate-like member of electrically semi-conductive material having an end surface disposed generally in alignment with the end surfaces of the electrodes and the explosive material being disposed adjacent the end surfaces of the electrodes and the semi-conductive plate-like member.

4. A squib as defined in claim 3, wherein the member which contacts and shunts the non-confronting surfaces of the electrodes is electrically connected to the plate-like member.

5. A squib as defined in claim 4, wherein the member which contacts and shunts the non-confronting surfaces of the electrodes and the plate-like member are integral, said two members substantially enclosing the electrodes on all but said end surfaces thereof.

6. A squib as defined in claim 5, comprising a metal housing overlying and intimately contacting the periphery of the member which contacts and shunts the non-confronting surfaces of the electrodes.

7. A squib as defined in claim 6, wherein the housing extends beyond the said end surfaces of the electrodes, the extension of said housing forming a cavity within which said explosive material is contained.

8. A squib comprising a body of semi-conductive material and a pair of elongated metallic electrodes embedded in said body with parallel flat confronting side surfaces and having adjacent ends thereof exposed flush with an end surface of the body, said parallel side surfaces being spaced apart in spark gap relation and in intimate contact with the material of the body therebetween whereby to form a shunted surface gap between the exposed adjacent ends of the electrodes across said end surface of the body.

9. A squib as defined in claim 8 comprising a metallic coating on said end surfaces of the electrodes and body electrically connecting said electrodes.

10. A squib as defined in claim 9, wherein the electrical resistance between said electrodes through said body and across said gap is of the order of approximately one-half ohm.

11. A squib as defined in claim 8 comprising means, forming a cavity, said end surface of the body constituting one wall of the cavity, and a charge of ignitable powder filling said cavity.

12. A squib as defined in claim 8, wherein the electrical resistance between said electrodes through said body and across said gap is of the order of approximately one ohm.

13. A squib as defined in claim 8, wherein the semi-conductive body comprises a matrix of electrical insulating material having a filler of finely divided electrically conductive material distributed therein.

14. A squib as defined in claim 13, wherein said insulating material is an epoxy resin.

15. A squib as defined in claim 13, wherein said electrically conductive material is finely divided graphite.

16. A squib comprising a body of molded electrically semi-conductive material and two elongated metallic electrodes embedded in and intimately engaging said body, said electrodes having broad parallel side surfaces in confronting relation and spaced apart in spark gap relation and adjacent end surfaces of said electrodes being flush with the surface at one end of said body whereby to form a shunted surface gap between the exposed adjacent ends of the electrodes across the surafce of the body at said one end thereof.

17. A squib as defined in claim 16 comprising means forming a cavity for an ignitable charge at said one end of the body, said means including an insulating cylinder in telescopic relation with a portion of the body at said one end thereof.

References Cited by the Examiner
UNITED STATES PATENTS

| | | | |
|---|---|---|---|
| 2,708,877 | 5/55 | Smits | 102—28 |
| 2,754,757 | 7/56 | MacLeod | 102—28 |
| 2,802,421 | 8/57 | Horne et al. | 102—28 |
| 2,957,227 | 10/60 | Scott | 29—155.62 |
| 2,960,933 | 11/60 | Scherrer | 102—28 |
| 2,974,590 | 3/61 | Ramer | 102—28 |
| 2,986,803 | 6/61 | Stresau et al. | 102—28 X |
| 2,986,805 | 6/61 | Jonke | 29—155.62 |
| 3,018,732 | 1/62 | Tognola | 102—28 X |
| 3,019,732 | 2/62 | Kaspaul | 102—28 |

SAMUEL FEINBERG, *Primary Examiner.*

ARTHUR M. HORTON, *Examiner.*